Patented Aug. 27, 1935

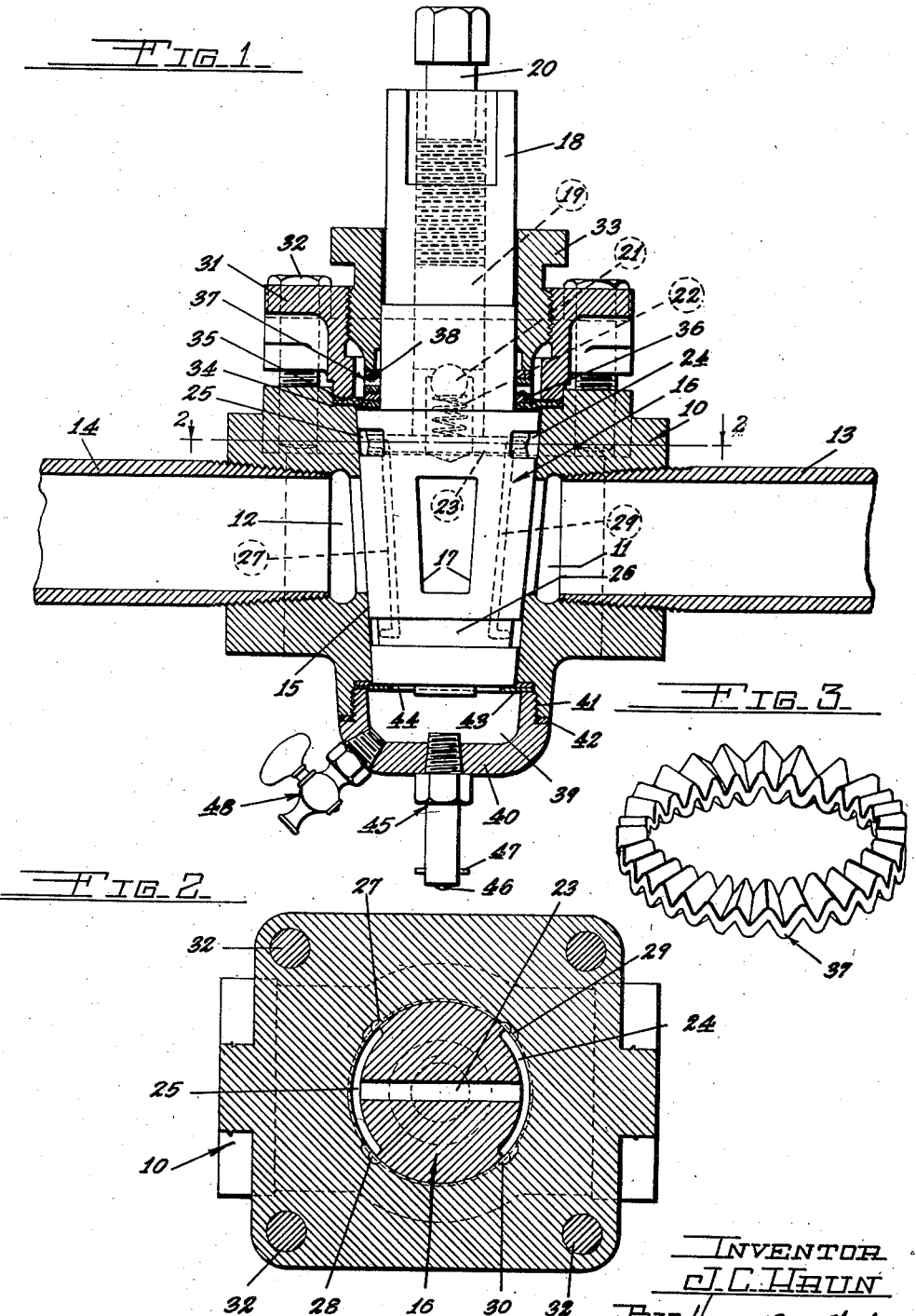

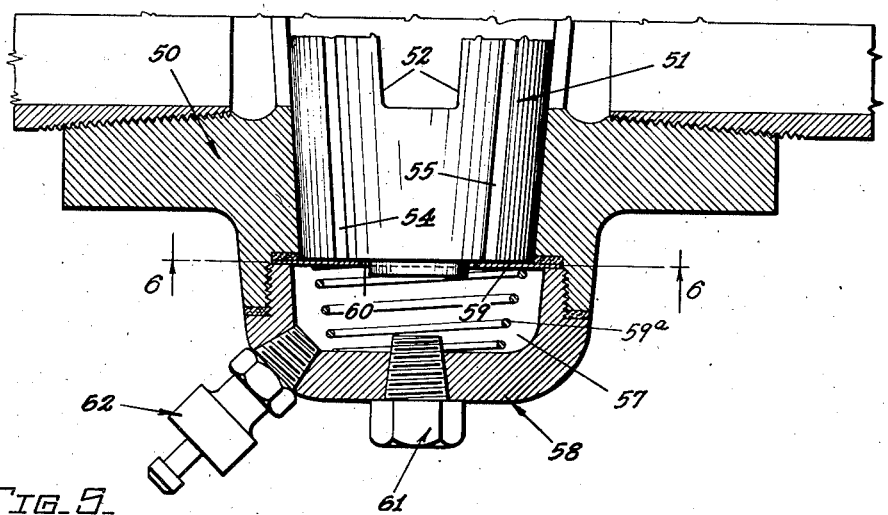
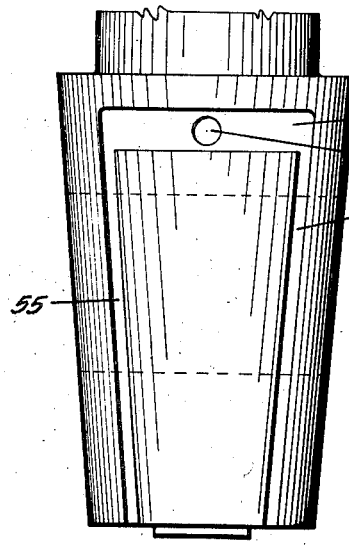
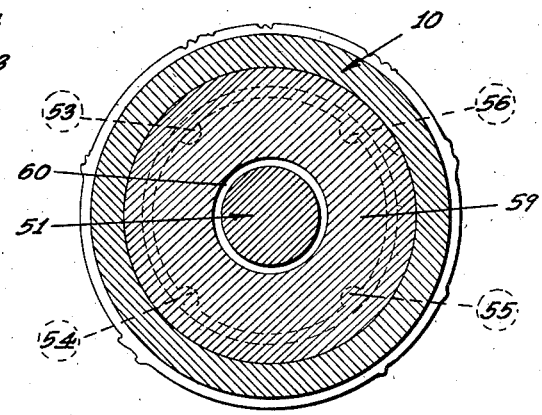
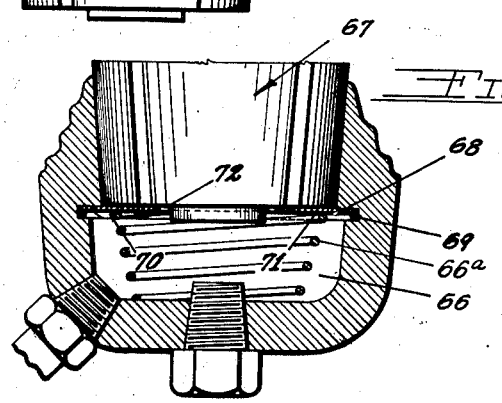

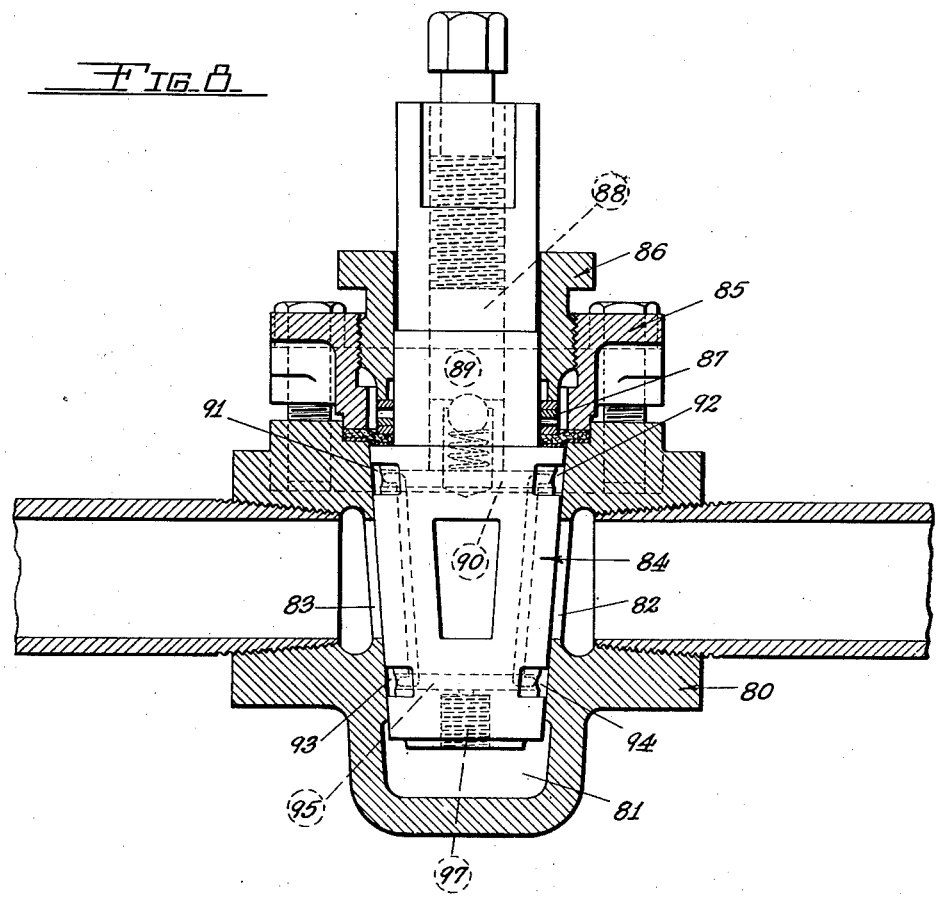
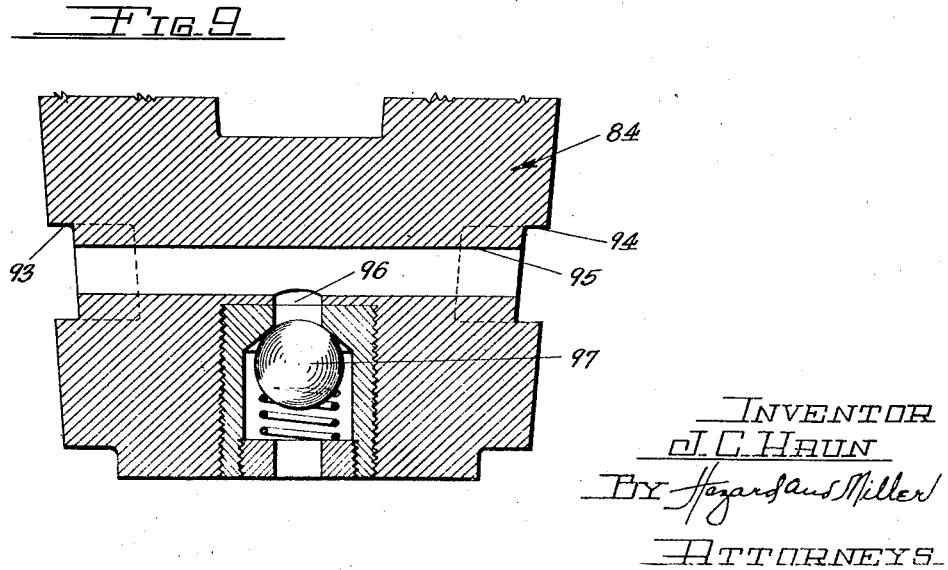

2,012,427

UNITED STATES PATENT OFFICE 2,012,427

PLUG INSTALLATION FOR LUBRICATED VALVES

Joye C. Haun, Manhattan Beach, Calif.

Application October 7, 1932, Serial No. 636,687

15 Claims. (Cl. 251—93)

This invention relates to lubricated valves and concerns particularly a method and means for mounting a rotary tapered plug in the housing of the valve. Valves of this general character have heretofore been produced wherein the plug was retained in the housing by a suitable relatively inelastic packing. The customary provision has been to provide a shoulder on the plug against which is compressed fiber or cork rings. Frequently asbestos or braided asbestos has been employed for this purpose, the construction being known generally as a "Durabla" packing. If the valve should be subjected to high line pressures, this packing had to be compressed against the plug with a considerable force in opposing the force exerted by the line pressure tending to remove the plug from the housing because of the exposed stem on the plug which is exposed to only atmospheric pressure. With the packing so highly compressed as to resist this outward movement of the plug, if the valve should subsequently be subjected to a low line pressure, the plug would be held so firmly against its seat that there would be a tendency for seizure or binding to take place between the plug and housing. Also when the valve happened to be subjected to high temperatures the packing has a tendency to harden and thus lose its packing effectiveness to prevent leakage. It has heretofore been proposed to use springs, as distinguished from relatively inelastic packing, to hold the plug against its seat in the housing. However, no satisfactory development has been made along this line insofar as I am aware because of the difficulty of being able to use a sufficiently strong spring and to provide the delicate adjustment of the spring necessary to enable the plug to freely operate under all conditions. For example, if the valve were subjected to a 3,000 pound line pressure, a sufficiently strong spring would have to be employed to resist the outward movement of the plug from the housing. If the valve were subsequently subjected to only a 100 pound line pressure, the spring would be urging the plug against its seat with so great a force that it would have a tendency to bind and seize on the housing unless provision were made to reduce the pressure or force exerted by the spring. Difficulties have been encountered in providing a delicate adjustment or a strong spring.

An object of the present invention is to provide an improved installation or mounting construction for the plug which will enable the use of a spring packing, the spring being advantageous in that its effectiveness is not lost by subjecting the valve to high temperatures; and to provide a way in which the force exerted by the spring can be delicately counterbalanced in accordance with line pressure conditions so that regardless of changes of line pressure the valve can be easily and quickly adjusted so that the plug will be held against its seat with only sufficient force to render a tight valve but yet will be sufficiently loose to enable rotation of the plug at all times without danger of binding or seizure.

Another object of the invention is to provide a valve having the above mentioned characteristics and which is so designed as to enable pressure to be applied to the small end of the tapered plug to jack the plug off of its seat in the event that it has corroded or for some other reason it has become stuck in the housing.

A further object of the invention is to provide a valve having a housing and a tapered rotary plug, the plug having suitable lubricant channels cooperating with lubricant channels on the housing to facilitate lubrication of the valve and to enable sealing of the ports thereof and to provide an arrangement whereby the fluid used in the lubricant channels may be effectively employed to counterbalance the effect of the spring packing.

With the foregoing and other objects in view, which will be made manifest in the following detailed description, and specifically pointed out in the appended claims, reference is had to the accompanying drawings for an illustrative embodiment of the invention, wherein:

Fig. 1 is a vertical section through a valve embodying the invention, the valve shown being illustrated as having lubricant channels between the plug and housing although the features of the invention are not limited to a valve of this character.

Fig. 2 is a horizontal section taken substantially upon the line 2—2 upon Figure 1.

Fig. 3 is a perspective view of the spring packing which may be employed.

Fig. 4 is a partial vertical section illustrating a slightly modified form of construction.

Fig. 5 is a view in side elevation of the plug shown in Figure 4, this view being taken at right angles to the view of the plug in Figure 4.

Fig. 6 is a horizontal section taken upon the line 6—6 upon Figure 4.

Fig. 7 is a partial view in vertical section illustrating a further modification.

Fig. 8 is a sectional view through another valve construction embodying the invention, showing a further modification.

Fig. 9 is a section through the lower portion of the plug of the valve, illustrating the details of its construction.

Referring to the accompanying drawings, wherein similar reference characters designate similar parts throughout, the improved valve comprises a housing 10 having ports 11 and 12 either of which may constitute an inlet port and the other an outlet port. These ports are internally threaded to receive the pipes 13 and 14 of the line. The housing provides a tapered bore 15 for a tapered rotary plug 16 having a passage 17 therethrough which will, on rotation of the plug, establish communication between the ports 11 and 12. The plug 16 has a stem 18 and in the valve shown this stem has a vertical bore 19 therein in which there is a threaded plug 20 providing for the insertion of lubricant into the valve. In the bottom of the bore 19 there is a check valve 21 urged into closed position by a spring 22. Bore 19 communicates with a diametrical bore 23 in the top of the plug and on opposite sides of the plug adjacent its top there are two arcuate horizontal lubricant grooves or channels 24 and 25. At the bottom of the plug there is an annular horizontal groove 26. On opposite sides of the port 12 there are two upright grooves or channels 27 and 28 and similarly on opposite sides of port 11 there are two upright grooves or channels 29 and 30. The lower ends of all of the upright grooves or channels are always in communication with the annular groove 26. The upper ends of grooves or channels 29 and 30 are in communication with horizontal groove 24 when the valve is in closed position and in this position the upper ends of grooves or channels 27 or 28 communicate with upper horizontal groove 25. As a means for retaining the plug in position in the housing there is provided a cap 31 which may be fastened in place as by cap screws 32. This cap is internally threaded to receive a gland 33.

The practice heretofore has been to use some relatively inelastic packing between the gland 33 and the shoulder at the top of the plug around the base of stem 18. The disadvantages of such packing, particularly when subjected to high temperatures, have already been explained. In the present invention I provide a thin metallic disc or diaphragm 34 which rests on a shoulder on the housing and extends over onto the shoulder on the plug. Above this diaphragm or washer there is a flexible packing ring 35 which may be of asbestos or the equivalent. Thereover there is positioned an annular ring or washer 36 constituting a lower seat for a spring. The particular form of spring may vary but the preferred form is illustrated in Figure 3 consisting of a corrugated ring indicated at 37. On top of the spring there is an upper washer or ring 38 which seats against the bottom of the gland 33. It is obvious that on screwing down gland 33 the spring 37 will be compressed, urging the tapered plug in the direction of its small end or in other words urging it to seat in the housing. Should the valve be subjected to high line pressures, the gland 33 will have to be tightened down with considerable force to cause the spring 37 to press upon the plug with sufficient force to overcome the effect of the line pressure on the plug. If the gland should be so adjusted, the valve would be unsuitable for use if it were subsequently subjected to much lower line pressures in that the force exerted by the spring would no longer be opposed by the line pressure to as great an extent with the result that there would be a much greater resultant force effective on the plug urging it into seating position. This high force tends to cause the plug to bind or seize in the housing, particularly after the plug has been operated several times even though the lubrication channels and lubricant is present. To adjust the spring by loosening gland 33 is difficult in that no delicate adjustment can be accomplished. If the gland should be left loose to relieve the spring and thus cause the plug to only lightly be urged toward its seat, a subsequent heavy line pressure will tend to lift the plug off of its seat and cause the valve to leak. In order to be able to tighten the gland 33 down against the spring and to leave it in such tightened position and enable the seating force of the plug on the seat to be varied in accordance with line conditions without disturbing the gland, I provide the housing with a well indicated at 39. This well may be integral with the housing as shown in Figure 7 or it may be provided by a separate part 40 threadedly attached to the bottom of the housing as by threads 41. Suitable gaskets 42 may be employed to prevent leakage. At the joint between the part 40 and the housing 10 there is mounted a thin metallic disc 43 constituting a diaphragm which may or may not have a central aperture 44 therein. This diaphragm extends over onto the bottom surface of the tapered plug 16. As a means for introducing fluid into the well 39 a suitable fitting 45 is mounted in part 40 having a check valve 46. This may be provided with lugs 47 facilitating attachment of a grease gun or the equivalent. The part 40 is preferably also provided with a relief valve or cock 48 for releasing fluid from the well when it is desired to decrease pressure therein.

The operation and advantages of the construction shown in Figure 1 are as follows: A minimum line pressure is first assumed and the gland 33 is tightened down sufficiently so as to cause the spring 37 to exert considerably more than enough pressure on the plug to hold it seated against the effect of the line pressure. A grease gun or the equivalent is then attached to fitting 45 and the well 39 filled with a fluid. This fluid may be any suitable fluid, preferably a liquid, and it may be a plastic sort of substance such as the grease used to lubricate the valve. When the well is filled, pressure is generated by the grease gun in the well which is effective on the bottom of the plug and which is in opposition to the spring. This pressure is insufficient to completely overcome the effect of the spring on the plug so that there is a slight net resultant force effective on the plug urging it toward the tapered seat 15 on the housing. This slight resultant force is sufficient to keep the plug firmly seated but it is not so great as to cause the plug to bind or seize on the housing. It will be appreciated that a small increase of fluid in the well 39 will lift the plug only an infinitesimal distance so that in this way an extremely delicate adjustment is possible. The advantages of a spring packing around the base of the stem are present which is of particular advantage in case the valve is subject to high temperature. Now if the line pressure should decrease, this net resultant force on the plug urging it toward its seat would then be too great to enable free turning of the plug without danger of seizure. Under these conditions additional fluid is forced into well 39 through fitting 45 which is sufficient to counterbalance the effect of spring 37 to a greater extent. Consequently this increase of fluid to well 39 reduces the net resultant force on the plug urging it downwardly to adjust the valve for the changed line conditions. In the event that the line pressure should subsequently increase, relief valve 48 can be opened slightly to relieve the pressure in well 39 and thus restore the valve to its original condition wherein the spring 37 overcomes the effect of the pressure in the well by a sufficient force to hold the plug seated against the effect of the line pressure. The improved arrangement is such as to prevent any leakage from well 39 into the line although the fluid in the well may be under quite a high pressure. The flexible metallic disc of the diaphragm 43 seats on the bottom of the plug and prevents any escape of liquid from the well. In this way quite a high pressure can be generated in the well without having an equivalent pressure in the bores 19 and 23 and in the lubricant channels. The construction is also advantageous in that if the plug should freeze in the housing for any reason, such as corrosion or erosion, it can be easily freed by loosening gland 33 and cap 31. Fluid pressure can then be applied in well 39 and the plug effectively jacked off of its seat in the housing. The diaphragm 43 remaining in contact with the plug during its initial upward movement will prevent any leakage of the liquid in well 39 into the line which is sometimes an important factor.

In Figure 4 there is disclosed a modified form of construction illustrating a slightly modified form of lubricant system. In this construction the upper portion of the valve, not shown, is substantially the same as that disclosed in Figure 1, consisting of the body or housing 50 in which there is the rotatable tapered plug 51 having the passage 52. In this construction, however, the top of the plug has two horizontal grooves corresponding to grooves 24 and 25. The housing, however, is not provided with any grooves corresponding to grooves 27, 28, 29 and 30. Equivalent grooves are formed on the plug, these grooves being indicated at 53, 54, 55 and 56. They extend downwardly from their corresponding horizontal grooves on the plug all the way to the bottom of the plug, terminating on the small end. The housing 50 provides a well 57, this well being provided by a threadedly attached dome or member 58. It clamps or mounts a diaphragm 59 similar to diaphragm 43 which is a flexible apertured disc of sheet metal having a central aperture 60. This diaphragm 59 is urged against the bottom of the plug 51 by means of a coiled spring or the equivalent, indicated at 59A, which is compressed in the well between the diaphragm 59 and the cap or member 58. Member 58 has a plug 61 in its bottom, which is removable as occasion requires, and in this form of the invention the relief valve 48 is replaced by an automatic pressure relief valve construction indicated at 62. Such an automatic relief valve may be used on the construction shown in Figure 1 in place of manually operated relief valve 48. It is not essential that the automatic form of relief valve be connected to well 57 but it may be connected to any point in the lubricant system. In the construction shown in Figure 1, however, where there is no communication between the lubricant system and the well the relief valve must be in communication with the well.

The purpose of showing the upright grooves as being all located on the plug in this modification is merely to illustrate that another type of lubricant system may be employed as distinguished from that specific type disclosed in Figure 1. In the modification shown in Figure 4 it is essential, however, that some communication be established between the lubricant system and the well 57. This communication is as follows. On introducing lubricant in the plug it follows down through the grease grooves 53, 54, 55 and 56, and escapes between the diaphragm and the bottom of the plug into well 57. The automatic pressure relief valve 62 can be adjusted so as to release the lubricant when a certain pressure is reached. On continuing to force lubricant into the well, the pressure is built up until the lubricant escapes from the automatic relief valve, thus indicating that the desired pressure for which the relief valve has been adjusted has been reached. Further admission of fluid is then discontinued. The pressure of the lubricant within the well, together with the pressure exerted by the spring 59A seats the diaphragm against the bottom of the plug, preventing reverse flow at any time from the well up into grooves 53, 54, 55 and 56, and in this respect the diaphragm acts somewhat as a check valve. Should the pressure within the grooves 53, 54, 55, 56 become lower at any time than the pressure in the well, the pressure is not released from the well but is maintained to counterbalance or to work in opposition to the spring at the top of the plug. This type of construction forms an easy way of causing the pressure in the well to counterbalance or oppose the spring packing inasmuch as the relief valve can be easily adjusted for the desired pressure in the well commensurate with line conditions and the lubricant forced into the system until grease escapes from the automatic relief valve.

In Figure 7 a construction is shown which enables the housing to be formed of one piece. In this construction the housing is indicated at 65, the bottom of which provides a well as at 66 beneath the plug 67. At the bottom of the plug the housing 65 is formed with a downwardly facing shoulder 68 adjacent a groove 69. A coiled spring or the equivalent, indicated at 66A, is inserted in the well 66, which is to serve the same purpose as spring 59A. A split spring ring 70 is introduced through the top of the tapered bore and while in contracted condition is forced down into the well. Thereafter the diaphragm or disc 71 having the aperture 72 therein is inserted and is cupped to enable it to be inserted into the groove 69 past shoulder 68. In this position it is allowed to straighten out in the groove against the shoulder and the split spring ring 70 can then be pulled upwardly, access being had to it through aperture 72, and allowed to expand into the groove to lock the diaphragm 71 in place. In other respects this type of construction may function in the same way as the diaphragm shown in Figure 4 or the diaphragm shown in Figure 1.

In Figures 8 and 9, a further form of the invention is illustrated wherein the housing is indicated at 80, having a well 81. The ports for the valve are indicated at 82 and 83, and the rotary plug is shown at 84. This plug is maintained in the body by a cap 85 having a gland 86 and the spring 87, which is similar to the spring 37. The stem has an axial bore 88, providing for the admission of lubricant, in which there is a check valve 89. This bore communicates with a diametrical bore 90, which communicates with horizontal channels 91 and 92 on the sides of the plug adjacent its top. Upright grooves or channels extend down on the interior of the body or housing 80 and when the valve is in fully closed position they connect the ends of channels 91 and 92 with corresponding channels 93 and 94 on the sides of the plug near its bottom. A diametrical groove 95 connects channels 93 and 94 through the plug with a short vertical bore 96 leading down into well 81. In this bore there is a check valve 97. In this construction lubricant can be forced into the valve through the bore 88 and pass into the lubricant grooves or channels and from these into the well to generate a pressure in the bottom of the plug in opposition to the spring 87. Should the pressure in the lubricant channels become lowered at any time, the pressure in the well is maintained by the check valve 97. This form of construction merely illustrates another type of check valve which will isolate the well from the lubricant channel system in the event that the pressure in the lubricant channel system is lowered so as to maintain the pressure in the well which will operate in opposition to the spring pressure on the plug.

In all modifications it will be noted that it is possible to obtain an extremely delicate adjustment of the force exerted on the plug urging it toward its seat to overcome the effect of the line pressure. It is also possible to vary this adjustment in accordance with changes of line pressure and in all instances rotation of the plug is virtually frictionless inasmuch as the bottom of the plug is resting on a body of liquid except for the slight engagement of the diaphragm with it. The presence of the fluid leaving a slight film between the diaphragm and the bottom of the plug reduces any friction taking place at this point. It will be noted that the improved construction is not limited to a lubricated valve inasmuch as the lubricant system shown in Figure 1 could be entirely omitted and the advantages of using a spring packing and an opposed hydraulic pressure would be present whether the lubricant system were present or not. In the constructions shown in Figures 4 and 7 a lubricant system is required but the lubricant system need not be that particular lubricant system shown. Any system of lubricant channels between the plug and housing which is so arranged as to communicate with well 66 or the equivalent would be suitable.

Various changes may be made in the details of construction without departing from the spirit or scope of the invention as defined by the appended claims.

I claim:

1. In combination with a valve having a housing, a rotary tapered plug therein, a spring urging the plug into seating position, the housing providing a well at the small end of the plug, a diaphragm in the well engageable with the small end of the plug preventing leakage from the well up between the plug and housing, and means providing for the forcing of a fluid into the well through the plug and past the diaphragm to be entrapped therein by the diaphragm to exert a pressure on the plug in opposition to the spring.

2. In combination with a valve having a housing, a rotary tapered plug therein, a spring urging the plug into seating position, the housing providing a well at the small end of the plug, a diaphragm in the well engageable with the small end of the plug preventing leakage from the well up between the plug and housing, means providing for the forcing of a fluid into the well through the plug and past the diaphragm to be entrapped therein by the diaphragm to exert a pressure on the plug in opposition to the spring, and means for releasing pressure in the well in accordance with varying operating conditions.

3. In combination with a valve having a housing and a tapered rotary plug, spring means urging the plug into seating position, said housing providing a well at the small end of the plug, a diaphragm in the well engageable with the small end of the plug having an aperture opposite the small end of the plug, there being lubricant channels between the seating surfaces of the plug and housing which lead to the small end of the plug, and means providing for the forcing of lubricant into the channels past the diaphragm and into the well to build up a pressure therein effective upon the plug in opposition to the spring means.

4. In combination with a valve having a housing and a rotary tapered plug, spring means urging the plug in the direction of its small end, said housing providing a well at the small end of the plug, there being lubricant channels between the seating surfaces of the plug and housing which communicate with the well, means providing for the forcing of lubricant through the channels into the well to build up a pressure effective on the plug in opposition to the spring means, and means for entrapping lubricant forced into the well and retaining it therein.

5. In combination with a valve having a housing and a rotary tapered plug, spring means urging the plug in the direction of its small end, said housing providing a well at the small end of the plug, there being lubricant channels between the seating surfaces of the plug and housing which communicate with the well, means providing for the forcing of lubricant through the channels into the well to build up a pressure effective on the plug in opposition to the spring means, means for entrapping lubricant forced into the well and retaining it therein, and means for releasing fluid in the well to reduce the pressure therein when operating conditions vary.

6. In a lubricated valve having a housing providing a tapered seat and a well, a passaged tapered rotary plug seated in the housing above the well, there being lubricant channels between the plug and the housing, means for introducing lubricant to the lubricant channels, and a diaphragm carried by the housing engageable with the plug having an aperture opposite the small end of the plug permitting lubricant to flow from the lubricant channels into the well but preventing reverse flow from the well to the lubricant channels.

7. In a lubricated valve having a housing providing a tapered seat and a well, a tapered rotary plug seated in the housing above the well, there being lubricant channels between the plug and housing, means for introducing lubricant into the lubricant channels and causing it to pass therefrom into the well, and means for entrapping lubricant in the well and preventing flow from the well reversely into the lubricant channels.

8. In a lubricated valve having a housing providing a tapered seat and a well, a tapered rotary plug seated in the housing above the well, there being lubricant channels between the plug and housing, means for introducing lubricant into the lubricant channels and causing it to pass therefrom into the well, means for entrapping lubricant in the well and preventing flow from the well reversely into the lubricant channels, and spring means urging the plug into seating position against the pressure of the lubricant in the well.

9. In a lubricated valve, a housing providing a tapered seat and a well, a tapered rotary plug seated in the housing above the well, means for retaining the plug in the housing, there being lubricant channels between the plug and housing, means for introducing lubricant into the lubricant channels and causing it to pass therefrom into the well, and means for entrapping lubricant in the well and preventing flow reversely therefrom into the lubricant channels.

10. In a lubricated valve, a housing providing a tapered seat and a well, a tapered rotary plug seated in the housing above the well, means for retaining the plug in the housing, there being lubricant channels between the plug and housing, means for introducing lubricant into the lubricant channels and causing it to pass therefrom into the well, means for entrapping lubricant in the well and preventing flow reversely therefrom into the lubricant channels, and means for creating a pressure in the lubricant in the well independently of that transmitted thereto through the lubricant channels.

11. In a lubricated valve, a housing providing a tapered seat and a well, a tapered rotary plug seated in the housing above the well, means for retaining the plug in the housing, there being lubricant channels between the plug and housing, means for introducing lubricant into the lubricant channels, means for permitting flow from the lubricant channels into the well but preventing flow from the well into the lubricant channels, and means for generating a pressure in the well.

12. In a lubricating valve, a housing providing a tapered seat and a well, a tapered rotary plug seated in the housing above the well, means for retaining the plug in the housing, there being lubricant channels between the plug and housing, means for introducing lubricant into the lubricant channels, means for permitting flow from the lubricant channels into the well but preventing flow from the well into the lubricant channels, and means for generating a pressure in the well independent of that generated in the lubricant channels.

13. In a lubricated valve, a housing, a rotary plug in the housing, means providing a well adjacent an end of the plug, a diaphragm against the end of the plug and extending across the ends of the seating surfaces between the housing and the plug, there being lubricant channels between the plug and housing, means for introducing lubricant into the lubricant channels, said diaphragm having a passage therethrough permitting lubricant to be expelled from the lubricant channels into the well and entrapped therein and serving to prevent reverse flow from the well into the lubricant channels.

14. In a lubricated valve having a housing, a rotary tapered plug therein, means providing a well adjacent one end of the plug within which a fluid may be confined, there being lubricant channels between the plug and housing, and means enabling lubricant to be forced from the lubricant channels into the well but preventing reverse flow from the well into the lubricant channels whereby the pressure of lubricant in the well may be retained although the pressure in the lubricant channels decreases.

15. In a lubricated valve having a housing, a rotary tapered plug therein, means providing a well adjacent one end of the plug within which a fluid may be confined, there being lubricant channels between the plug and housing, means enabling lubricant to be forced from the lubricant channels into the well but preventing reverse flow from the well into the lubricant channels whereby the pressure of lubricant in the well may be retained although the pressure in the lubricant channels decreases, and means providing an openable outlet from the well.

JOYE C. HAUN.